United States Patent [19]

Hulme-Lowe et al.

[11] Patent Number: 4,948,715

[45] Date of Patent: Aug. 14, 1990

[54] POLYMERIC POLYMETHINE DYES AND OPTICAL DATA STORAGE MEDIA CONTAINING SAME

[75] Inventors: Alan G. Hulme-Lowe; Andrew C. Jackson, both of Bishop's Stortford,, England; Vivien L. Bell, St. Paul, Minn.

[73] Assignee: Minnesota Mining and Manufacturing Company, St. Paul, Minn.

[21] Appl. No.: 305,418

[22] Filed: Feb. 1, 1989

[30] Foreign Application Priority Data

Feb. 15, 1988 [GB] United Kingdom ................. 8803416

[51] Int. Cl.$^5$ ................................................ G03C 172
[52] U.S. Cl. .................................. 430/495; 430/945; 525/329.4; 525/329.5; 525/329.9; 525/332.7; 525/333.6; 528/123
[58] Field of Search .............................. 430/495, 945; 525/329.4, 329.5, 329.9, 332.7, 333.6; 528/123

[56] References Cited

U.S. PATENT DOCUMENTS

| | | | |
|---|---|---|---|
| 3,196,153 | 7/1965 | Riehen | 528/123 |
| 4,108,922 | 8/1978 | Crescentini et al. | 260/830 |
| 4,501,876 | 2/1985 | Zahr | 528/232 |
| 4,547,444 | 10/1985 | Bell et al. | 430/11 |
| 4,551,413 | 11/1985 | Bell | 430/270 |

OTHER PUBLICATIONS

Institute of Chemical Physics, Academy of Sciences of the USSR, A. N. Chigir et al., "Preparation of Polymeric Analogs of Polymethine Dyes".
Progress in Organic Coatings, 10 (1982) 252–287, "Polymeric Dyes–Synthesis, Properties and Uses".
Pure and Appl. Chem., vol. 52, pp. 1923–1928, 1980, "Macromolecular Dyes, Oligomeric and Unsaturated Dyes for U.V. Curing", E. Marechal.

Primary Examiner—Paul R. Michl
Assistant Examiner—Ashley I. Pezzner
Attorney, Agent, or Firm—Donald M. Sell; Walter N. Kirn; Mark A. Litman

[57] ABSTRACT

A polymeric tetra-aryl polymethine dye of the general formula

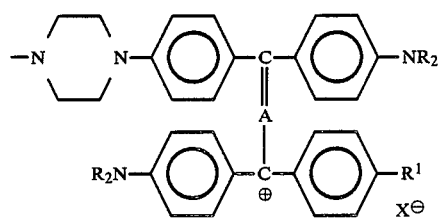

in which:
A comprises a conjugated chain of carbon atoms having an equal number of double and single bonds,
each R independently represents an alkyl group of 1 to 4 carbon atoms
$R^1$ represents $-NR_2$ or

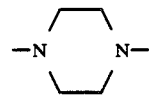

and
$X^-$ represents an anion.

The dyes are suitable for use as recording media in optical recording elements in which information may be recorded and read directly afterwards by means of laser light.

19 Claims, No Drawings

POLYMERIC POLYMETHINE DYES AND OPTICAL DATA STORAGE MEDIA CONTAINING SAME

FIELD OF THE INVENTION

This invention relates to polymeric polymethine dyes, to their preparation and to their use in optical recording elements. In particular the invention relates to polymeric tetra-aryl polymethine dyes.

BACKGROUND TO THE INVENTION

In response to the demand for more reliable and higher capacity data storage and retrieval systems, there is considerable activity in the research and development of so-called optical disk recording systems. These systems utilize a highly focused modulated beam of light, such as a laser beam, which is directed onto a recording layer which is capable of absorbing a substantial amount of light. The heat thus produced causes the light-absorbing material in the areas struck by the highly focused laser beam to change chemically and/or physically, thus producing a concomitant change in optical properties, e.g. transmissivity or reflectivity in the affected area. For readout, the contrast between the amount of light transmitted or reflected from the unaffected parts of the absorbing layer and from the marked areas of the layer is measured. Examples of such recording systems are disclosed in numerous patents such as U.S. Pat. Nos. 3,314,073 and 3,474,457. In recording data, a rotating disk having a light-absorptive recording layer is exposed to modulated radiation from a laser source. This radiation is passed through a modulator and appropriate optics and the highly focused laser beam is directed onto the disk which forms by chemical and/or physical reaction of the light-absorbing layer a series of very small marks along a circular path within the light-absorptive layer. The frequency of the marks is determined by the modulator inputs. Using laser beams with a diameter of 1 micron or less, data can be stored at a density of $10^8$ bits/cm$^2$ or higher.

The simplest optical disk medium consists merely of a dimensionally stable solid substrate on which is coated a thin layer of light-absorptive material such as a metal layer. When the light-absorptive layer is struck by an intense beam of coherent light, such as from a laser source, the light-absorptive material is vaporized, thermally degraded, and/or otherwise physically and chemically modified, thereby producing a very small marked area which exhibits different transmissivity or reflectivity than the adjacent unmarked layer.

The desired properties of optical recording media are (1) high sensitivity, (2) high signal-to-noise ratio (SNR), (3) high tolerance to material variation, contaminants and other defects, and (4) high archival stability after extended storage and/or recording and readout (see Bartolini J. Vac. Sci. Technology Vol. 18, No. 1. Jan/Feb. 1981, P.70).

A wide range of materials have been used as the light-absorptive material for the recording layer of optical recording elements. For example, thin films of metals, particularly tellurium and its alloys have been used. A number of organic based light-absorptive materials have also been employed, particularly dye/polymer composites in which an organic dye is dissolved or dispersed in an organic polymer binder. Examples of dye-containing recording media are disclosed in U.S. Pat. Nos. 4,023,185, 4,097,895, 4,101,907, 4,190,843, 4,218,689, 4,219,826, 4,241,355, 4,242,689, 4,315,269 and WIPO Patent Publication Nos. WO84/02794 and WO84/02795.

More recently the use of polymeric dyes as optical recording media has been disclosed. Examples of such media are disclosed in U.S. Pat. No. 4,501,876 and Japanese Kokai Nos. JA59-045195, JA59-062188, JA59-185694, JA59-229396, JA59-232894, JA59-232896, JA60-018387 and JA60-044554.

Despite the great amount of research and development in this area of technology and the great number of materials tested, there is still a demand for a material which will exhibit the capability of being formed into optically suitable imaging layers with both low cost of manufacture and with high performance reliability and stability.

BRIEF SUMMARY OF THE INVENTION

The present invention provides novel polymeric tetraaryl polymethine dyes suitable for use as ablative absorbing layers in optical data storage media.

Therefore according to one aspect of the present invention there is provided a polymeric compound having a plurality of units of the general formula:

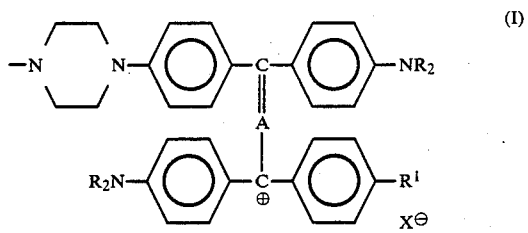

(I)

in which:

A comprises a conjugated chain of carbon atoms having an equal number of double and single bonds, each R independently represents an alkyl group of 1 to 4 carbon atoms, preferably $CH_3$ $R^1$ represents $-NR_2$ or

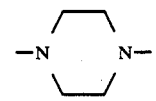

and $X^-$ represents an anion.

DESCRIPTION OF PREFERRED EMBODIMENTS

The units generally comprise at least 20%, preferably at least 30% by weight of the polymeric compound, the remainder comprising chains of organic groups which may be aliphatic, aromatic heterocyclic or mixtures thereof.

The polymeric dyes of the invention absorb in the near infrared and are suitable for use as recording media for optical data storage either alone or together with other polymeric material. In addition the polymeric dyes may find utility as photoconductible materials, antihalation layers of X-ray film or near infrared screening materials.

The polymeric dyes of the invention may include the chromophore within the backbone chain of the polymer or as pendant groups from the backbone chain.

Polymeric dyes in which the chromophore portion is within the backbone chain may have repeating units of the general formula:

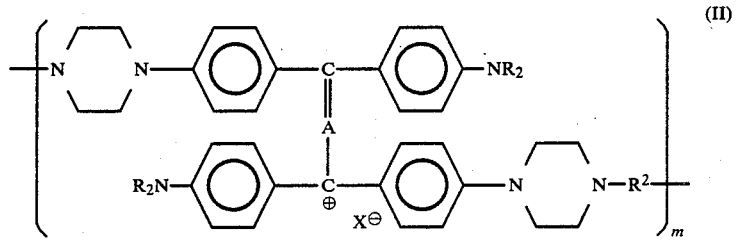

in which
R, A and $X^{\ominus}$ are as defined above,
m is an integer of at least 2, and
$R^2$ represents a group connecting adjacent units.

The conjugated chain of carbon atoms A preferably comprises a chain of 3 carbon atoms, but may include 5, 7, 9 etc., carbon atoms with alternating double and single bonds.

The group $R^2$ may be selected from a wide range of organic groups. In general the group is derived from any difunctional compound capable of undergoing linking reactions with secondary amines, e.g. by ring-opening, addition, or condensation reactions.

Polymer dyes of formula (II) may be prepared by the following reaction scheme:

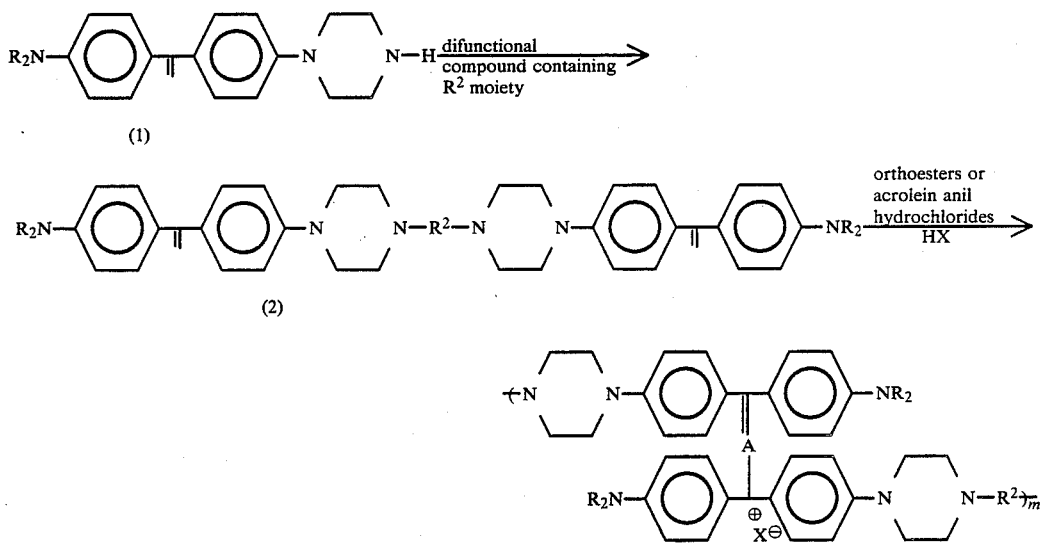

in which R, $R^2$, A, m and $X^-$ are as defined above.

The intermediates (2) are formed by reaction of the secondary amine (1) with a difunctional moiety such as a bis-epoxide, acid chloride, benzyl halide, azlactone, chloroformate, isocyanate, or sulphonyl chloride.

Examples of useful difunctional compounds include the following:

Product of a condensation between bisphenol-A and glycidyl ether

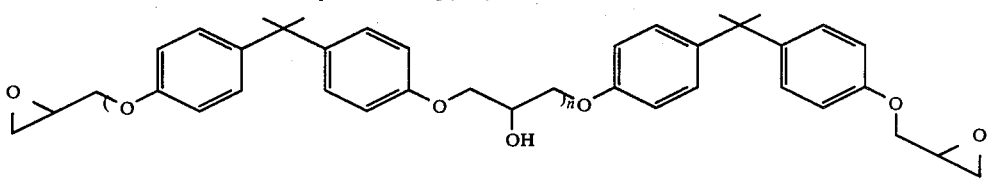

Hexanedioyl dichloride

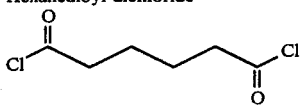

1,4-Bis(bromomethyl)benzene

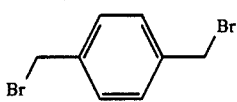

2,2'-p-phenylenebis[5(4H)-oxazolone]

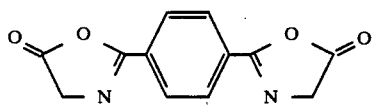

Carbonochloric acid, 1,4-butanediyl ester

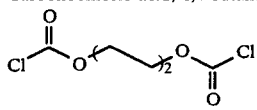

1,3-Diisocyanato-4-methylbenzene

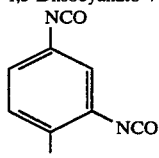

Biphenyl-4,4'-disulphonyldichloride

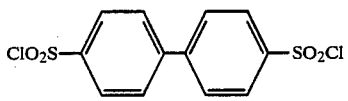

In accordance with one aspect of the invention the polymeric dyes comprise a polymeric chain having a plurality of pendant groups of the formula:

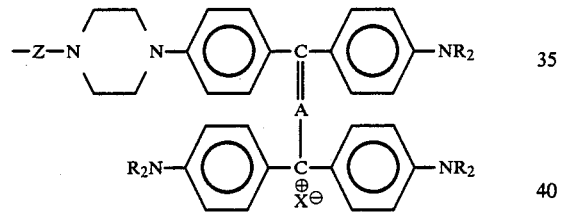

in which:
R, A and $X^\ominus$ are as defined above, and
Z represents a bridging group which links the chromophore group to the polymeric chain.

In general, the polymeric dyes in which the chromophore portion comprises pendant groups from the backbone chain will have the general formula:

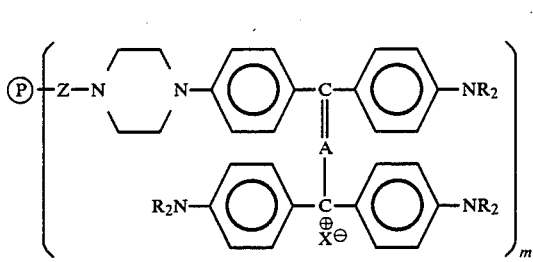

(III)

in which:
R, A, $X^\ominus$ and m are as defined above,
P represents a linear polymeric backbone, and
Z represents a bridging group which links the dye moiety to the polymer backbone, and which is derived from a functionality capable of undergoing linking reactions with a secondary amine, e.g. by addition, condensation or ring-opening.

Polymeric dyes of formula (III) may be prepared according to the following reaction scheme:

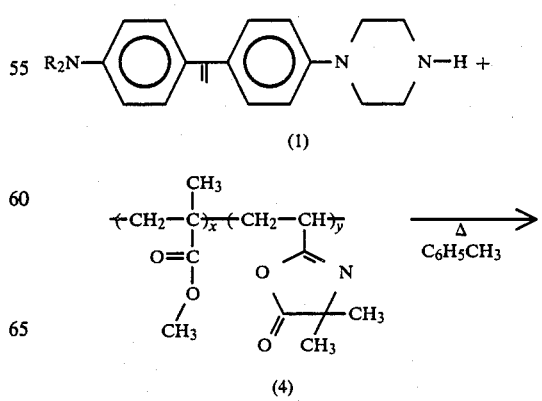

-continued

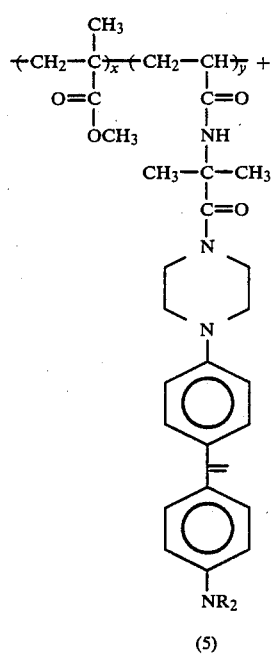

(5)

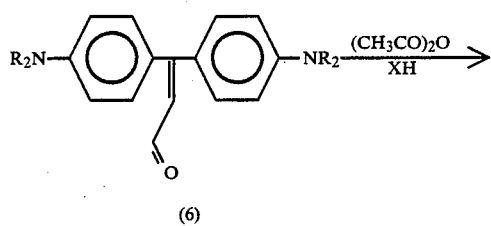

(6)

-continued

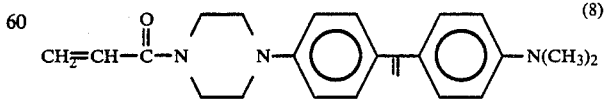

(7)

in which R and X⁻ are as defined above and x and y represent the mole fractions of the constituent monomers of the copolymer such that $x+y=1$, $y>0$.

Reaction of a functionalized olefin (1) with a group pendant to a polymer produces pendant olefin (5). Subsequent reaction in acid media with the acrolein (6) produces the pendant dye (7).

This route may have advantages over the approach producing the chromophore in the backbone chain, since the portion of the product polydye most likely to degrade will be the conjugated chromophore. In this scheme the dye is pendant and degradation would therefore affect only colour intensity rather than degrade the polymer backbone. The preparation of pendant dye also allows the solubility and physical characteristics of the product to be adjusted over a wide range by modification of the backbone or supporting polymer.

Additionally, the reactive secondary amine of the functionalized olefin can be reacted with acryloyl chloride to provide the acryloyl substituted piperazine.

$$CH_2=CH-\underset{\underset{O}{\|}}{C}-N\diagup\hspace{-0.5em}\diagdown N-\bigcirc\hspace{-0.3em}=\hspace{-0.3em}\bigcirc-N(CH_3)_2 \quad (8)$$

The acrylic group of compound (8) will survive subsequent reaction with a further molecule of (8) to provide:

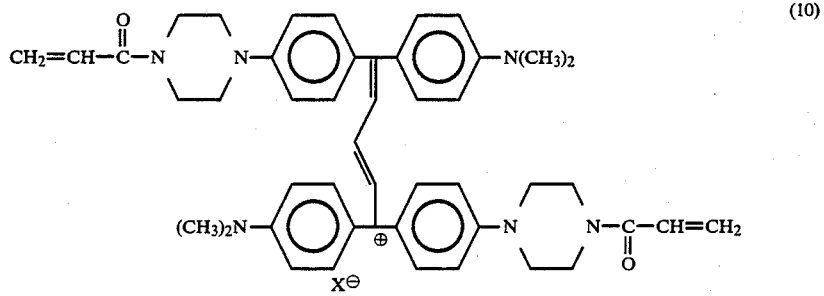
(10)

The acrylic group of compound (8) will similarly survive subsequent reaction with a molecule of acrolein (6) to provide:

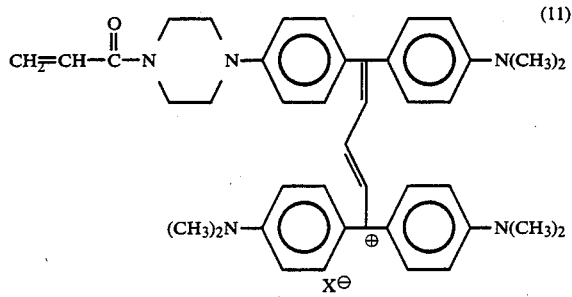
(11)

Compound (11) may be polymerized or copolymerized using standard radical initiation techniques to produce pendant polymeric dyes. Compounds (10) or (11) may be used in radical initiated curing reactions to tie the dye into a cured matrix.

The linking group Z in formula (III) may be derived from a variety of functionalities capable of reaction with secondary amines, such as acid chloride, benzyl chloride, sulphonyl chloride, isocyanate, azlactone, epoxide and chloroformate.

In formula (III), P may represent any one of a wide range of polymer backbones prepared by conventional free-radical, ionic, condensation or ring-opening techniques, familiar to those skilled in the art. For example, the backbone may be formed by radical or ionic polymerization (or copolymerization) of acrylate, methacylate, styryl or vinyl derivatives; by condensation of a diol or a diamine with a diester, a di-isocyanate, or a bis (acid chloride); or by ring-opening polymerization of epoxy derivatives.

Well known monomers that are useful in building the polymer of formula (III) include acryloyl chloride, chloromethyl styrene, stryenesulphonyl chloride, isocyanatoethyl methacylate, 2-vinyl-4,4dimethyloxazolone, and glycidyl methacrylate.

The molecular weights of the polymeric dyes may vary over a wide range, but generally those in the range $10^3$ to $10^6$ are most useful.

The anion $X^\ominus$ is not of critical importance to the behaviour of the polymeric dyes and may be selected from organic or inorganic ions. Suitable anions include $Cl^\ominus$, $Br^\ominus$, $BF_4^\ominus$, $PF_6^\ominus$. $SbF_6^\ominus$, $AsF_6^\ominus$, $ClO_4^\ominus$, $CH_3C_6H_4SO_3^\ominus$, $CF_3SO_3^\ominus$. A preferred anion is $CF_3SO_3^\ominus$.

In the polymethine chain represented by A in formulae I, II and III, the preferred number of carbon atoms is 3, but longer chains may be built using methods described in WO84/02795. Each R group in formulae I, II and III is preferably $CH_3$.

The polymeric dyes of the invention may be employed as recording media for optical data storage. Preferably the polymeric dyes are used without a binder although binders may be employed. The use of the polymeric dyes in absence of a binder has the following advantages compared to recording media of the dye in binder type:

1. High chromophore concentration can be obtained without the special solubility relationships required between dye and binder.
2. High clarity of the layer is easily obtained thus giving less background noise.
3. The chromophores do not migrate or become lost from the layer during the thermoplastic action, thus facilitating reuse.
4. There is no danger of dye crystallization on keeping.
5. Polymeric dyes are frequently more stable to heat than the individual dyes, e.g., IR chromophores.

The optical recording element of the invention may be in the form of a support having a recording layer coated thereon comprising a polymeric dye, or the element may be in the form of a self-supporting structure; e.g., a cast film. The dye must be present in the region of the surface of the recording layer in a sufficient amount to absorb an effective amount of the exposing radiation to produce a detectable mark on the surface thereof. It is not possible to generally quantify the minimum amount of dye required for optical recording either in terms of coating weights of optical density of the recording layer or element since the minimum amount will vary according to the dye, the thickness of the recording layer or the construction of a self-supporting element and the presence of any binder. For example, a thick layer of recording medium having a high optical density and coating weight of dye may have inferior performance to a thin layer having a lower optical density and coating weight.

The thickness of the coated recording layer is an important factor in controlling the efficiency of the laser in forming pits since good writing sensitivity requires that writing energy be effectively coupled into the recording layer. A. E. Bell and F. W. Spong, I.E.E.E. Journal of Quantum Electronics, July 1978, 487, discloses, in general, that optimum write situations are obtained when the recording layer has a thickness about one quarter the wavelength of the recording light. In recording elements of the present invention sensitivity is improved as the thickness of the recording layer is reduced below 1 micron and in preferred embodiments the thickness is in the range from 30 to 400 nm, although a general range of 10 to 1000 nm may be used.

The recording layer is generally coated onto a substrate which acts as a support. The support may be substantially any solid material, either flexible or rigid including polymeric materials; e.g., polyacrylates, polyamides, polycarbonates, polyesters, polyolefins, polysiloxanes, polyurethanes and polyvinyl resins; ceramic or glass materials; fibrous materials and metals. The support must have a melting point high enough to avoid deformation during writing of information. Also the surface of the substrate which is to be coated should be smooth and free of random surface irregularities, although it may be flat, pre-grooved or may include predetermined surface irregularities capable of being read by laser light in the final element to provide an indexing function or the like.

In one embodiment of the invention the substrate is transparent so that recording and reading can take place through the substrate.

Preferably a light reflecting layer is provided, either between the substrate and the recording layer, or, if writing and reading is to take place through the substrate, on top of the recording layer. A preferred construction comprises a semi-reflecting layer interposed between the recording layer and the transparent substrate as described in J60/157739. Suitable reflective materials include aluminium, copper, chromium, gold and rhodium. The thickness of the light reflecting layer should be sufficient to reflect a significant amount of the recording light. Levelling and/or priming layers may also be applied to the substrate before application of the reflective coating and/or dye layer. If the reflecting material itself can be formed so it is a self-sustaining layer and optically smooth, it may constitute the substrate.

A recording element in which there is both a reflecting layer and the recording layer is termed a bilayer system. This can be expanded to a trilayer system by the insertion of a spacer between the reflecting layer and the recording medium. The spacer may confer smoothness, help control the thermal performance of the medium and protect the reflecting layer. A dielectric spacer may comprise vacuum deposited $SiO_2$, or an organic polymer which does not contain any of the light-absorbing dye. The dielectric spacer is preferably transparent to the laser beam used in reading and writing on the recording layer. Examples of the construction of such recording elements are disclosed in Bartolini et al., J. Quantum Electronics, 1981, page 69.

In the recording elements of the present invention the recorded information is carried in the form of marks; e.g. about 1 micron in size, in the recording layer. Because of the high density of the information, dust or other foreign material on the top surface of the recording layer would cause significant errors. Therefore, in one embodiment of recording elements of the present invention a protective layer of least 0.6 mm thick is provided on top of the recording layer to separate dust and other particles from the recording layer. The laser beam is sharply convergent at the top surface of the recording layer and accordingly any dust particle on the protective layer would be out of focus with respect to the laser beam and thus not affect the reading and writing process. The protective layer can be made of any material which is transparent to laser beams used in reading and writing on the recording layer and it can either be directly in contact with the recording layer or separated from it by an air, nitrogen gap or vacuum gap. Suitable materials which can be used for the protective coating include glass, poly(methyl methacrylate), polycarbonates and polyesters.

The recording elements of the invention may be double-sided, comprising a planar substrate optionally in the form of a disc, having on each major surface a reflecting layer, above which is coated the recording medium and optionally a protective layer.

Other suitable constructions of optical recording elements are disclosed in The Design and Optimisation of the Optical Data Disk, Alan E. Bell, Proceedings of the SID, Vol 24/1, 1983.

The solvent used for preparing the coating composition may be selected from a wide range of known solvents such as dichlorinated solvents; e.g., dichloromethane and 1,2-dichloroethane, or ketonic solvents; e.g., cyclohexanone, or aromatic solvents; e.g., xylene. The solvents can be used alone or in combination, the choice being governed by the solubility of the polymeric dye and by the method of coating used.

Suitable methods of coating the compositions include handcoating, dipcoating, spincoating and webcoating. A very suitable proces is, in particular, the centrifugal spincoating process. According to this process, the substrate to be covered is laid on a turntable and a quantity of solution is then provided on the substrate. By rotating the substrate, the liquid will spread circularly over the surface of the substrate. It has been found in experiments that very thin layers can be obtained by means of the centrifuging process, the thickness of which depends inter alia on the rotation speed of the substrate and the viscosity of the solution to be spread. It has been found that layers having a thickness smaller than 1 micron are obtained if the viscosity of the solution lies in the order of magnitude of a few cP, for example, up to 10 cP, and a speed of rotation of approximately 500 to 2500 rpm is used. The percentage of solid substance in the solution must also be preferably low and generally be at most 5 to 10% by weight. Film thicknesses less than 0.3 micron can readily be achieved in this manner.

In an illustrative recording system embodying the principles of the present invention, a record blank comprising a disc-shaped substrate coated with a reflective layer, recording medium of the invention and a protective layer, is subjected to rotation at a constant rotational speed while a beam of light from a light source (e.g., a laser providing light at a wavelength at which the recording medium is absorbing) is focussed on the coated surface of the disc. The intensity of the light beam is controlled in accordance with information to be recorded. Illustratively, the control is effected in accordance with carrier waves modulated in frequency by picture-representative video signals, with the light beam intensity varying as a result between a high level sufficient to effect ablation of the absorptive material and a low level insufficient to effect such ablation, the frequency of the level alternations varying as the video signal amplitude changes.

Information tracks comprising a succession of spaced pits are formed in the coated surface of the disc, the pits appearing in those surface regions exposed to high level beam, due to vaporization or melting of the absorptive layer material in response to the high level beam exposure. Variations in the length and separation of the pits are representative of the recorded information. Where a continuous sequence of pictures is to be recorded, a spiral information track may be formed by providing relative motion, in a radial direction and at a constant rate during the recording between the recording beam and the rotating disc. Alternatively, in the absence of such relative motion during the recording, a circular information track may be formed.

The result of the above-described recording process is the formation of an information record in a form which facilitates recovery of the recorded information by optical playback process. The information track of such an information record comprises undisturbed surface regions that exhibit very low reflectance at an appropriate light frequency, alternating with pit regions, formed by the ablation process, that exhibit appreciably high reflectance at the same light frequency. A high ratio between the reflectance of the pit regions and the reflectance of the intervening (undisturbed surface) regions is readily provided. Media exhibiting lower reflectivity after writing may also be made.

In playback operations pursuant to the principles of the present invention, a light beam is focussed upon the information track of a rotating information record of the above described type. The playback beam has a constant intensity at a level insufficient to effect ablation of the disc coatings, and is of a frequency substantially corresponding to that at which the undisturbed surface regions exhibit an antireflection condition. A photodetector, positioned to receive light reflected from the successive regions of the information track as they pass through the path of the focussed light, develops a signal representative of the recorded information. A high readout contrast ratio (due to the large differences in reflectance of the pit regions and the intervening track regions at the light frequency of the playback beam) is readily obtained permitting recording of the recorded signals with an excellent signal-to-noise ratio.

The invention will now be illustrated by the following Examples.

EXAMPLE 1

Synthesis of a dye in which the chromophore is in the backbone chain of the polymer.

The following reaction scheme was employed:

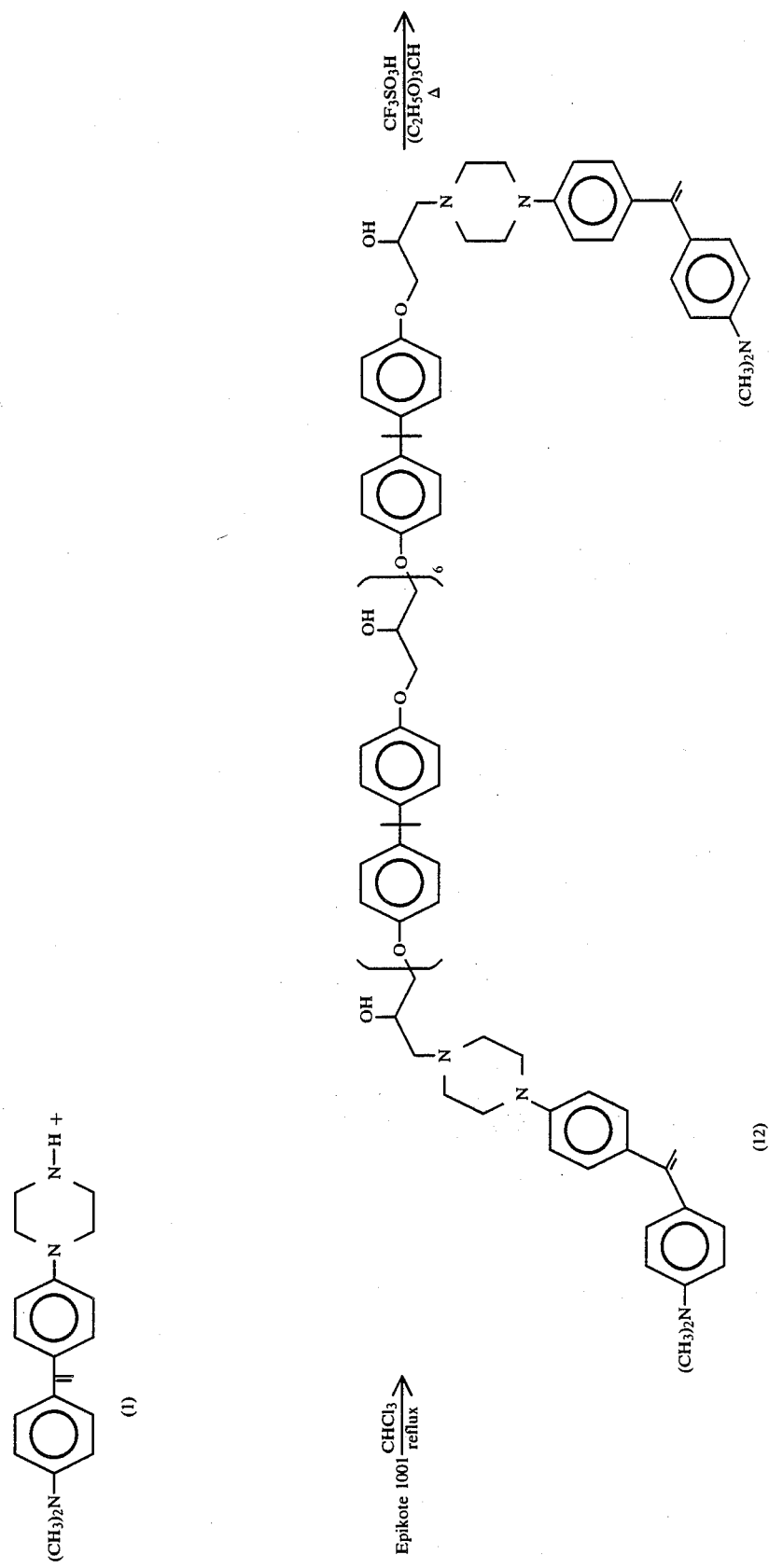

-continued
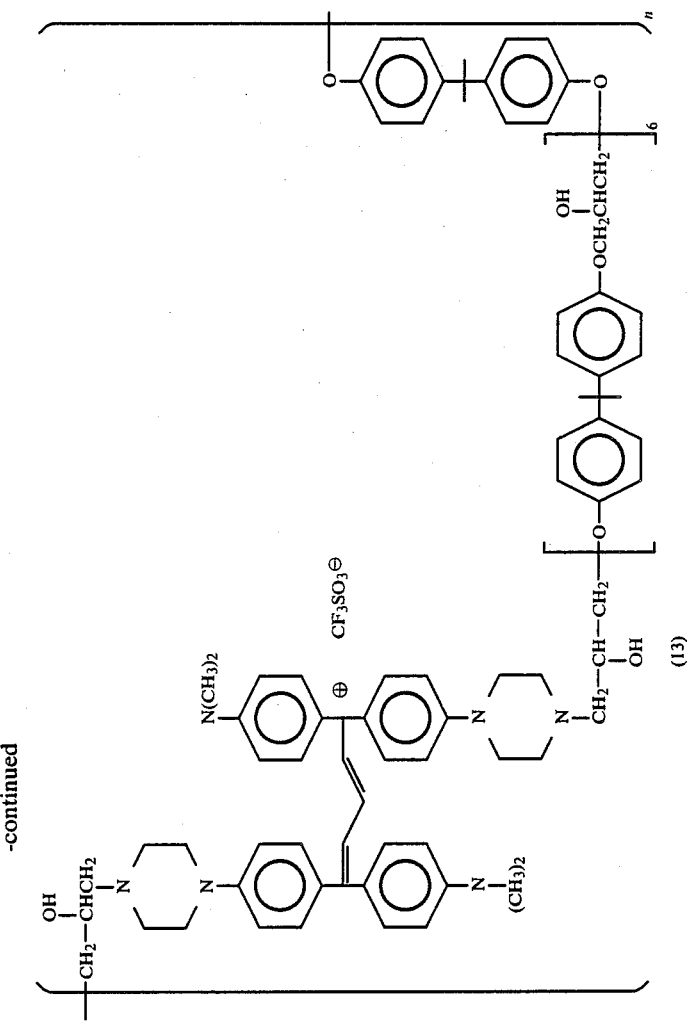
(13)

Synthesis of Compound No. 1

Triphenylmethyl chloride (49.3 g, 0.177 mole) was added to a stirred solution of triethylamine (17.0 g, 0.177 mole) and 4'-piperazinoacetophenone (36.1 g) in $CH_2Cl_2$ (650 ml) and refluxed for 21 hr. The cooled solution was washed with water, dried ($Na_2SO_4$) and evaporated. The residue was crystallised from ether to yield 55.6 g of the N-triphenylmethyl derivative.

A solution of this compound (26.8 g) in dry tetrahydrofuran (THF) (120 ml) was treated at 0° C. with a solution of 4-dimethlaminophenylmagnesium bromide, obtained from 19.2 g bromo-arene, 2.5 g Mg turnings and 180 ml THF. The mixture was stirred at room temperature under Ar for 22 hr., treated with 10% HCl (180 ml), stirred a further 22 hr., then diluted with ether and the phases separated. The ether layer was washed with water, and the combined aqueous layer made basic with $NaHCO_3$. Extraction with $CHCl_3$ furnished the crude product (26.4 g); which was purified by chromatography on neutral alumina (450 g) using $CHCl_3$ as eluant, giving 6.7 g pale yellow solid.

Synthesis of Compound No. 12

Epikote 1001, commercially available from Shell Chemicals, (1.66 g, 3.32–3.69 mmol) was added to a stirred solution of Compound No. 1 (1.00 g, 3.25 mmol) in $CHCl_3$ (20 ml, inhibitor free) at room temperature. The stirred solution was warmed to reflux for 96 hours. After the reflux none of the starting amine remained (by TLC, alumina $CHCl_3$). The reaction mixture was allowed to cool and the pale orange solution precipitated by addition to 40–60 petrol ether (350 ml) with vigorous stirring. The cream-coloured precipitate was collected by suction filtration, washed with petrol ether and dried under vacuum.

Yield=2.413 g. 'H NMR ($CDCl_3$) 7.71–7.3 (m), 6.7 (d), 4.1, 3.2, 2.6 (m), 1.6 (s).

Synthesis of Polymer No. 13

A solution of $CF_3SO_3H$ (290 mg, 1.9 mmol) in $(CH_3CO)_2O$ (5 ml) was added to a mixture of Compound No. 12 (2.00 g,–2.63 mmol by olefin content) and $(C_2H_5O)_3CH$ (0.47 g, 0.53 ml, 3.2 mmol) in $(CH_3CO)_2O$ (5 ml) at room temperature. The mixture was placed in a pre-heated oil bath at 100° C., and maintained at 100° C. with stirring for 0,5 hr. During this time a deep blue product formed. The resulting mixture was cool-washed from the reaction vessel with $CHCl_3$ and precipitated in diethyl ether (500 ml). The precipitate was collected by filtration, washed with ether and dried overnight in vacuum.

Yield=0.62 g. Some chloroform insoluble blue material was formed.

Examination by GPC indicated that the chloroform insoluble material (DMF soluble) has a much higher molecular weight. (88 kg/mole.)

NIR $\lambda$ max ($Me_2CO$) 809 nm $\epsilon = 3.5 \times 10^4$.

'H NMR ($CDCl_3$) 6.7–7.2 (m), 3.5 (m), 2.1, 1.6, 1.2, NMR is as expected for the product as drawn except acetylation of alcohols has taken place.

EXAMPLE 2

Synthesis of a dye in which the chromophore is present as pendant groups on the backbone chain of a polymer.

The following reaction scheme was employed in which the non-chromophore segments are derived from a preformed backbone polymer:

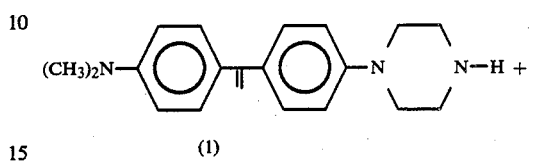

(1)

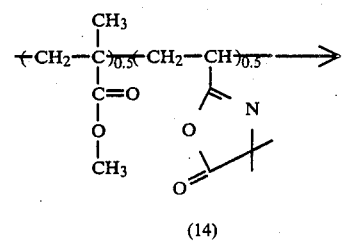

(14)

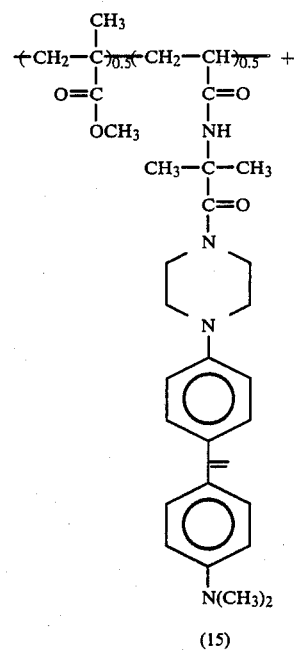

(15)

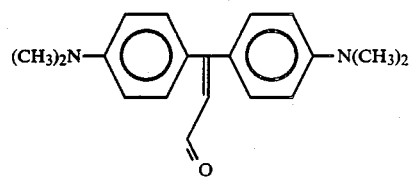

(6)

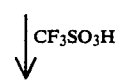

-continued

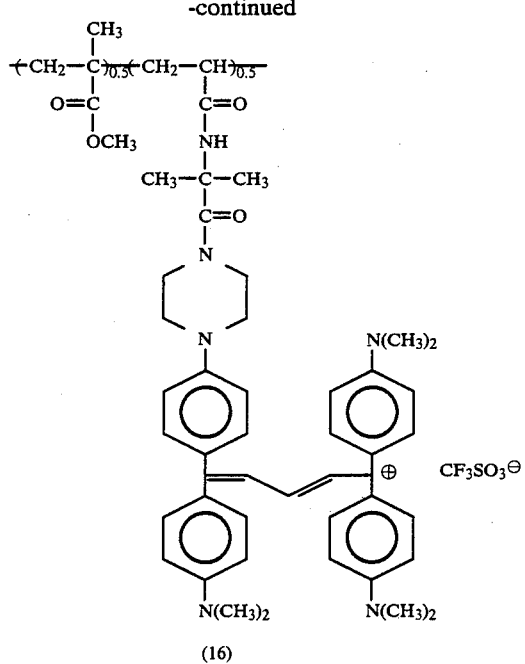

(16)

Synthesis of Compound No. 14

The copolymer was prepared as described by S. Heilmann et al in *J. Polym. Sci. Polym. Chem. Edn* 22, 1179 (1984), and in U.S. Pat. No. 4,304,705.

Synthesis of Compound No. 15

0.65 g of Compound No. 1 ($2.124 \times 10^{-3}$ mole) in 20 ml $CHCl_3$ were added to 1.16 g copolymer (14) dissolved in 30 ml $CHCl_3$ ($1.924 \times 10^{-3}$ mole vinyl dimethyloxazolone equivalent) with stirring and the mixture raised to reflux for 24 hours. The mixture was precipitated in ether and reprecipitated with $CHCl_3/Et_2O$ until TLC showed no free olefin in the product. The slightly off-white product was collected by filtration and vacuum dried.

Yield=0.632 g.

'H NMR ($CDCl_3$) 7.1–7.3 (m), 5.2 (d), 3.6 (s), 2.9 (s), 1.3 (s).

Synthesis of Compound No. 6

4.4'-Bis (dimethylamino) benzophenone (590 g) in dry THF (91) was added over 3 hours to a solution of methylmagnesium iodide prepared from MeI (205.5 ml), Mg (80.3 g) and 1 liter ether. After the initial reaction had subsided, the mixture was maintained at 40° C. for 20 hours. Water (2 liters) was added slowly, followed by 2 liters of ether. The aqueous layer was further extracted with ether (3×1 liter), treated with 200 ml acetic acid, and extracted with further 1 liter of ether. The combined ether layers was washed with brine, dried ($MgSO_4$), evaporated, and the residue crystallised from EtOH to yield 416 g 1,1-bis (4; dimethylaminophenyl) ethene, Melting Point=123.4° C.

This compound (133 g) in $CH_2Cl_2$ (1 liter) was added at 0° C. to a solution obtained by adding $POCl_3$ (120 ml) in $CH_2Cl_2$ (200 ml) to a mixture of DMF (175 ml) and $CH_2Cl_2$ (1 liter) cooled to 0° C. After four hours at room temperature, the mixture was poured into water (3 liters) and partially neutralized with NaOH solution. When solids began to separate, the layers were separated and the aqueous layer extracted once with $CH_2Cl_2$. The combined organic layers were evaporated, and the residue boiled with 1.5 liters EtOH. The EtOh was decanted from a tarry residue, treated with 80 ml 20% NaOH, and cooled overnight. The resulting solid was crystallised from EtOH, giving 62 g product, Melting Point=181° C.

Synthesis of Compound No. 16

0.5 g of Compound No. 15 ($1.107 \times 10^{-3}$ mole olefin) and 0.32 g Compound No. 6 were dissolved in 20 ml acetic anhydride.

A 20% mole excess of trifluoromethane sulphonic acid (0.203 g) was added in acetic anhydride solution to the stirring mixture when the colour changed to deep green. The mixture was heated at 85° C. with stirring for 4 hours, the solution rapidly becoming blue. The product was precipitated in ether, collected by filtration, washed in ether and vacuum dried overnight. Yield=0.91 g.

The product was soluble in chloroform. max (NIR) 806 nm.

EXAMPLE 3

Comparison of polymeric dyes and monomeric dye as optical data storage media.

The polymeric dyes of Examples 1 and 2 were compared with monomeric dye of the formula:

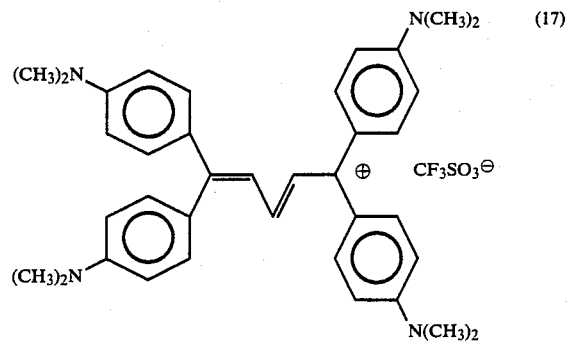

(17)

Recording elements were prepared by spin-coating solutions on the grooved 5.25 inch (13.34 cm) diameter aluminium reflectorised substrates. The coating compositions were solutions containing approximately 1% solids, polymeric dyes being coated as solutions in 4:1 v/v acetonitrile/cyclohexanone and Compound (17) as a solution in 1,2-dichloroethane/cyclohexanone (4:1), without the addition of a binder.

Coating thickness after air drying at ambient temperature was approximately 0.1 micron.

Each of the recording elements were tested using dynamic media characterization apparatus similar to that described in pp 159–162 of volume 382 of the Proceedings. of SPIE (1983).

Pits were written with 10 mW incident laser power, modulated at 2.5 MHz with a 50% duty cycle square wave. The laser power was 1.2 mW, for repeated-read tests. Carrier-to-noise ratio (CNR) was measured with a 30 MHz resolution band width using a spectrum analyser. Disk rotation speeds and test radii were chosen to give linear velocities in the range 8 to 12 m/s.

The initial CNR and change in CNR after 10K reads for each element is reported in the following Table.

| Recording Medium | Initial CNR (dB) | Change in CNR (dB) after 10K reads @ 1.2mW |
|---|---|---|
| Compound No 13 | 46.9 | −0.9 |
| Compound No 16 | 49.0 | −12.0 |
| Compound No 17 | 46.4 | −20.5 |

It can be seen that the initial CNR of all the samples is approximately the same. However, the CNR values after repeated reading clearly show an advantage of using polymeric dyes of this invention (Compound Nos. 13 and 16), in that thermal degradation (as shown by CNR) is much less marked.

What we claim is:

1. A polymeric dye having a plurality of units of the general formula:

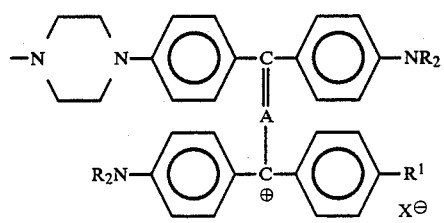

wherein:
each R represents an alkyl group of 1 to 4 carbon atoms,
A represents a conjugated chain of carbon atoms having an equal number of double and single bonds,
$R^1$ is a member of the group consisting of $-NR_2$ and

and
$X^-$ represents an anion.

2. A polymeric dye according to claim 1 wherein said units comprise at least 20% by weight of the polymeric dye.

3. A polymeric dye according to claim 1 wherein said units comprise at least 30% by weight of the polymeric dye.

4. A polymeric dye according to claim 1 of the general formula:

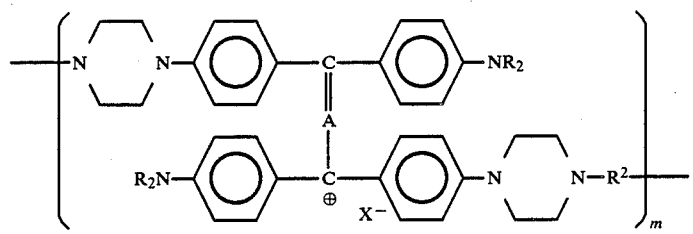

wherein:
R, A and $X^-$ are as defined in claim 1,
m is an integer of at least 2, and
$R^2$ represents a linking group connecting adjacent units.

5. A polymeric dye according to claim 1 comprising a polymeric chain having a plurality of pendant groups of the formula:

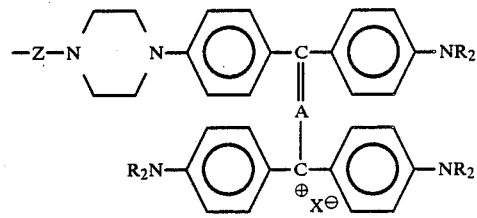

wherein:
R, A and $X^-$ are as defined in claim 1, and
Z represents a bridging group which links the chromophore group to the polymeric chain.

6. A polymeric dye according to claim 5 of the general formula:

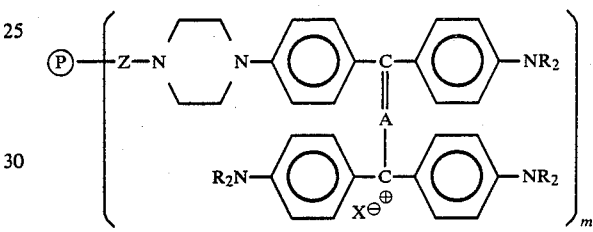

wherein:
A, R, and $X^-$ are as defined in claim 5 and m is an integer of at least 2,
ⓟ represents a linear polymeric backbone, and
Z represents a bridging group which comprises the residue from the reaction of a mono-functional compound with a secondary amine.

7. A polymeric dye according to claim 6 wherein polymeric backbone ⓟ is a member of the group consisting of styryl, vinyl ester, epoxy polymers and copolymers.

8. A polymeric dye according to claim 6 wherein Z is derived from a benzyl halide, sulphonyl halide, isocyanate, azlactone, epoxide or chloroformate.

9. A polymeric compound according to claim 4 wherein $R^2$ is derived from a difunctional compound selected from the condensation product of bisphenol-A and glycidyl ether, hexanedioyl chloride, 1,4-bis(-bromomethyl)benzene, 2,2'-p-phenylenebis[5(4H)-oxazolone], carbonochloric acid 1,4,-butanediyl ester, 1,3-diisocyanato-4-methyl benzene and biphenyl-4,4'-disulphonyl chloride.

10. A polymeric compound according to claim 1 wherein A represents a conjugated carbon atom chain of 3 carbon atoms and R is methyl.

11. A method of preparing a polymeric compound which comprises the following reaction scheme:

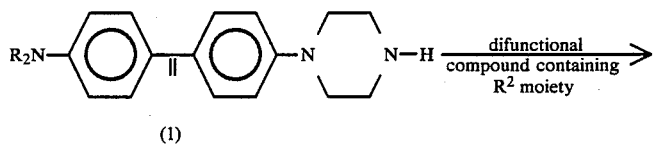

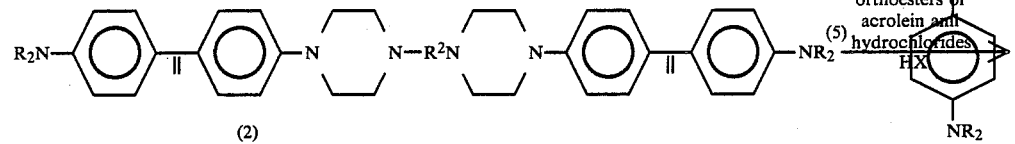

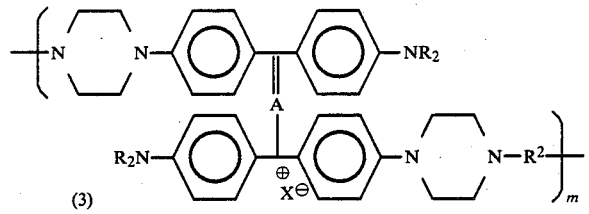

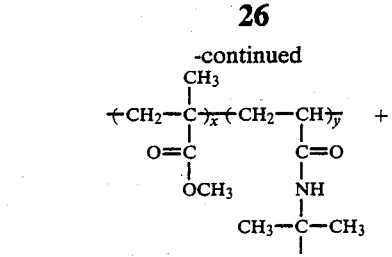

wherein:

R, R², m and X⁻ are as defined in claim 4.

12. A method according to claim 11 wherein the difunctional compound is selected from the condensation product of bisphenol A and glycidyl ether, hexanedioyl chloride, 1,4-bis(bromomethyl) benzene, 2,2'-p-phenylenebis[5(4H)-oxazolone], carbonochloric acid 1,4-butanediyl ester, 1,3-diisocyanato-4-methylbenzene and biphenyl-4,4'-disulphonyl chloride.

13. A method of preparing a polymeric compound which comprises the following reaction scheme:

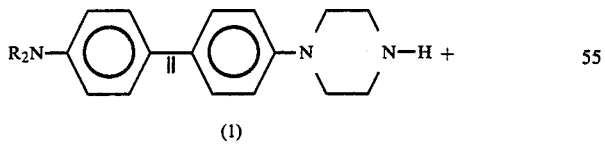

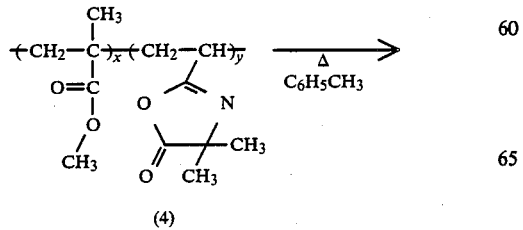

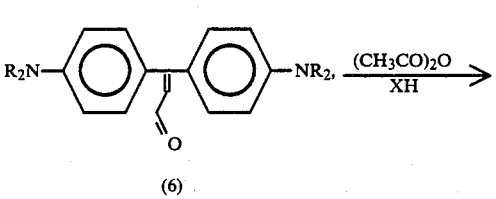

-continued

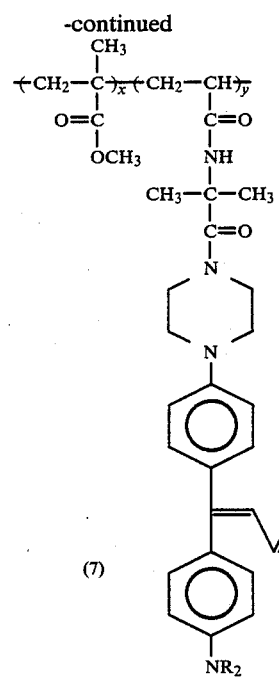

(7)

wherein R and X⊖ are as defined in claim 1, and x and y represent the mole fractions of the constituent monomer units in the copolymer such that $x+y=1$ and $y>0$.

14. An optical recording element in which information can be recorded and read directly afterwards by means of laser light, the element comprising, as a recording medium a polymeric compound of the general formula:

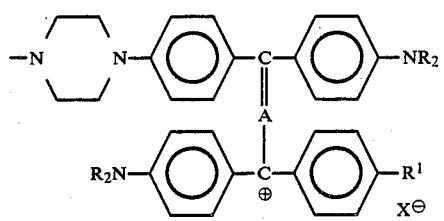

wherein:
each R represents an alkyl group of 1 to 4 carbon atoms,
A represents a conjugated chain of carbon atoms having an equal number of double and single bonds,
$R^1$ is a member of the group consisting of $-NR_2$ and

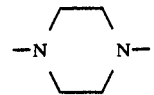

and
$X^-$ represents an anion.

15. An optical recording element according to claim 14 wherein said units comprise at least 20% by weight of the polymeric dye.

16. An optical recording element according to claim 14 wherein the polymeric dye has the general formula:

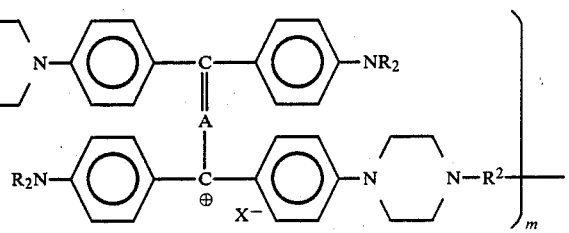

wherein:
each R represents an alkyl group of 1 to 4 carbon atoms,
A represents a conjugated chain of carbon atoms having an equal number of double and single bonds,
$R^1$ is a member of the group consisting of $-NR_2$ and

and
$X^-$ represents an anion,
m is an integer of at least 2, and
$R^2$ represents a linking group connecting adjacent units.

17. An optical recording element according to claim 14 wherein the polymeric dye comprises a polymeric chain having a plurality of pendant groups of the formula:

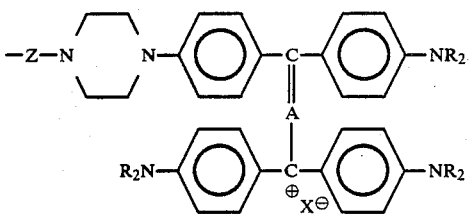

wherein:
each R represents an alkyl group of 1 to 4 carbon atoms,
A represents a conjugated chain of carbon atoms having an equal number of double and single bonds, $R^1$ is a member of the group consisting of —$NR_2$ and

and $X^-$ represents an anion, and

Z represents a bridging group which links the chromophore group to the polymeric chain.

18. An optical recording element according to claim 14 wherein the polymeric dye is of the formula:

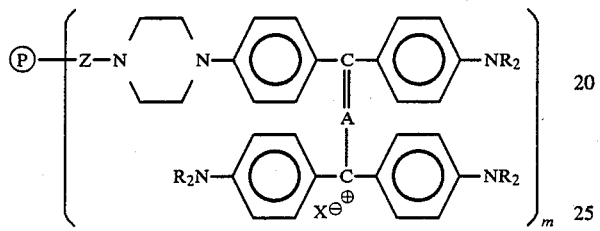

wherein:

each R represents an alkyl group of 1 to 4 carbon atoms,

A represents a conjugated chain of carbon atoms having an equal number of double and single bonds, $R^1$ is a member of the group consisting of —$NR_2$ and

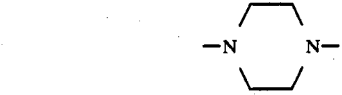

and $X^-$ represents an anion, and m is an integer of at least 2,

Ⓟ represents a linear polymeric backbone, and

Z represents a bridging group which comprises the residue from the reaction of a mono-functional compound with a secondary amine.

19. An optical recording element according to claim 14 in the form of:
 (a) a self-supporting film comprising the polymeric compound,
 (b) a support having a layer of the recording medium coated thereon,
 (c) a support having a light reflective surface to which the recording layer is applied,
 (d) a support having a dielectric layer over which is coated the recording medium,
 (e) a transparent substrate having a semi-reflective layer over which is coated the recording medium, or
 (f) a substantially planar support having on each major surface a reflecting layer above which is coated a recording layer.

* * * * *